(12) United States Patent
Elgarat et al.

(10) Patent No.: US 10,776,251 B1
(45) Date of Patent: Sep. 15, 2020

(54) SYSTEM, METHOD, AND COMPUTER PROGRAM FOR AUTOMATICALLY CONVERTING MANUAL TEST CASES TO AUTOMATED TEST STRUCTURES IN A SOFTWARE TESTING PROJECT

(71) Applicant: Amdocs Development Limited, Limassol (CY)

(72) Inventors: Sharon Elgarat, Kibbutz Mefalsim (IL); Meni Kadosh, Ashkelon (IL); Yaron Weiss, Champaign, IL (US)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 128 days.

(21) Appl. No.: 15/653,197

(22) Filed: Jul. 18, 2017

Related U.S. Application Data

(60) Provisional application No. 62/365,925, filed on Jul. 22, 2016.

(51) Int. Cl.
| | |
|---|---|
| *G06F 11/00* | (2006.01) |
| *G06F 11/36* | (2006.01) |
| *G06F 8/60* | (2018.01) |
| *G06F 8/70* | (2018.01) |

(52) U.S. Cl.
CPC ........... *G06F 11/3684* (2013.01); *G06F 8/60* (2013.01); *G06F 8/70* (2013.01); *G06F 11/3604* (2013.01); *G06F 11/3664* (2013.01); *G06F 11/3688* (2013.01)

(58) Field of Classification Search
CPC ............ G06F 11/3684; G06F 11/3604; G06F 11/3664; G06F 11/3688; G06F 11/26; G06F 11/263; G06F 11/36; G06F 11/3672; G06F 11/3676; G06F 11/368; G06F 11/3692; G06F 11/3696; G06F 8/60; G06F 8/70
See application file for complete search history.

(56) References Cited

U.S. PATENT DOCUMENTS

| | | |
|---|---|---|
| 7,337,432 B2 | 2/2008 | Dathathraya et al. |
| 7,581,212 B2 | 8/2009 | West et al. |
| 8,122,293 B2 | 2/2012 | Lee et al. |
| 8,799,720 B2 | 8/2014 | Lau et al. |

(Continued)

FOREIGN PATENT DOCUMENTS

| | | |
|---|---|---|
| CN | 103186460 A | 7/2013 |
| CN | 104899136 A | 9/2015 |
| WO | 2015012814 A1 | 1/2015 |

*Primary Examiner* — Anthony J Amoroso
(74) *Attorney, Agent, or Firm* — Zilka-Kotab, P.C.

(57) ABSTRACT

A system, method, and computer program product are provided for automatically converting manual test cases to automated test structures in a software testing project. In operation, an activity being tested associated with at least one software testing project is identified. Additionally, an automated test case is created based on a manual test case associated with the activity being tested. Further, the automated test case is linked to a generic reusable automated activity group. In addition, one or more parameters associated with measurements of the activity being tested and corresponding values associated with a current testing instance are identified. Moreover, a work flow is automatically generated for the reusable generic activity group available for future testing use, based on the one or more parameters and the corresponding testing values.

7 Claims, 6 Drawing Sheets

(56) References Cited

U.S. PATENT DOCUMENTS

| | | |
|---|---|---|
| 9,038,026 B2 | 5/2015 | Chandra et al. |
| 9,053,236 B1 | 6/2015 | Covarrubias et al. |
| 2005/0172270 A1 | 8/2005 | Dathathraya et al. |
| 2010/0083053 A1* | 4/2010 | Narayanan .......... G06F 11/3684 714/46 |
| 2010/0229155 A1* | 9/2010 | Adiyapatham ..... G06F 11/3672 717/124 |
| 2012/0198280 A1* | 8/2012 | Cao .................... G06F 11/3684 714/32 |
| 2013/0097586 A1* | 4/2013 | Chandra ............. G06F 11/3684 717/124 |
| 2013/0159974 A1 | 6/2013 | Norton et al. |
| 2016/0132426 A1* | 5/2016 | Crawshay ........... G06F 11/3688 714/38.1 |

* cited by examiner

SYSTEM, METHOD, AND COMPUTER PROGRAM FOR AUTOMATICALLY CONVERTING MANUAL TEST CASES TO AUTOMATED TEST STRUCTURES IN A SOFTWARE TESTING PROJECT

CLAIM OF PRIORITY

This application claims the benefit of U.S. Provisional Application No. 62/365,925, filed Jul. 22, 2016, the entire contents of which are incorporated herein by reference.

FIELD OF THE INVENTION

The present invention relates to software testing, and more particularly to efficiently converting manual test cases to automated test structures in software testing projects.

BACKGROUND

In traditional test automation platforms, the creation of an automated test case is performed by an automation designer. The automation designer must create the different activities and actions within the test case and link scripts to those actions, in the case those actions were already automated in the past, or create the scripts if they are unique.

When building complex automation test cases that contain parameters that impact the automation flow, the automation designer must also include the workflow logic to indicate which actions must be executed as part of the test in the case various values appear. This limits the automation generation to people with knowledge in automation testing and workflow maintenance skills.

There is thus a need for addressing these and/or other issues associated with the prior art.

SUMMARY

A system, method, and computer program product are provided for automatically converting manual test cases to automated test structures in a software testing project. In operation, an activity being tested associated with at least one software testing project is identified. Additionally, an automated test case is created based on a manual test case associated with the activity being tested. Further, the automated test case is linked to a generic reusable automated activity group. In addition, one or more parameters associated with measurements of the activity being tested and corresponding values associated with a current testing instance are identified. Moreover, a work flow is automatically generated for the reusable generic activity group available for future testing use, based on the one or more parameters and the corresponding testing values.

DETAILED DESCRIPTION

Figure 1:
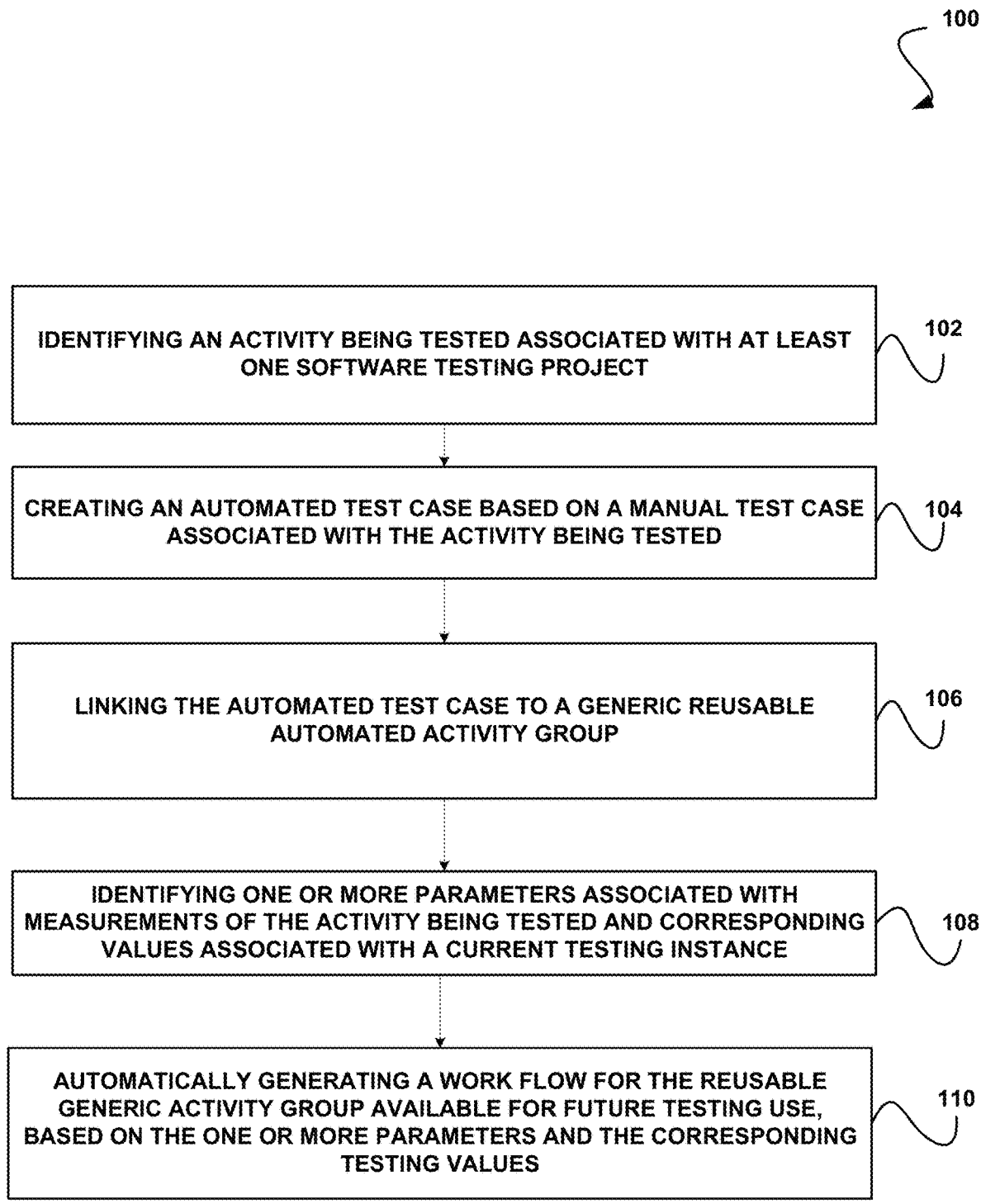
FIG. 1 illustrates a method for automatically converting manual test cases to automated test structures in a software testing project, in accordance with one embodiment.

FIG. 1 illustrates a method 100 for automatically converting manual test cases to automated test structures in a software testing project, in accordance with one embodiment.

As shown, an activity being tested associated with at least one software testing project is identified. See operation 102. The software testing project may be associated with any industry. For example, in one embodiment, the software testing project may be associated with the telecommunications industry. Further, the software testing project may be associated with any application, computer code, or portions thereof.

Additionally, an automated test case is created based on a manual test case associated with the activity being tested. See operation 104. In this case, an automation system automatically generates the automated test case based on manual steps that would need to be performed to execute the test case.

Further, the automated test case is linked to a generic reusable automated activity group. See operation 106. This may include associating the test case with the generic reusable automated activity group (e.g. with an identifier, etc.), adding the test case to a specific folder or database associated with the generic reusable automated activity group, and/or otherwise linking the automated test case to a generic reusable automated activity group.

In addition, one or more parameters associated with measurements of the activity being tested and corresponding values associated with a current testing instance are identified. See operation 108. The parameters may include any parameter associated with the current testing instance. The corresponding values may include any potential value or range of values within a scope of the current testing instance.

Moreover, a work flow is automatically generated for the reusable generic activity group available for future testing use, based on the one or more parameters and the corresponding testing values. See operation 110. The work flow may be created utilizing one or more automated activities.

In one embodiment, a system may implement the method 100 for automating the conversion of manual test cases to automated tests structure, allowing non-automation experts to generate efficient and reusable automated test cases. In this case, the automated conversion process implemented by the system identifies the activity being tested, creates the automated test case, links the automated test case to the generic automated activity group, identifies the parameters with which the activity is measured and the values it is being tested with in this instance. Using this information, the system automatically builds the work flow for the reusable generic activity group so that, in the future, testers may reuse the automated building block for other flows. At the end of the automatic conversion, the tester receives a fully structured test case, built based on the structure of the manual test case and that is linked to a higher activity group in which the current test case is a possible flow within the activity, determined by parameters and valid values.

Once the tester starts to follow the test case steps, in one embodiment, the tester may be prompted by the system to use self service capabilities to complete scripts for unique steps in the activity that were never shown in past conversions of the tests that belong to the same activity group. In another embodiment, the system may automatically complete the scripts.

It should be noted that the method 100 may be implemented utilizing various systems (e.g. the automation system of FIG. 4, etc.), hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
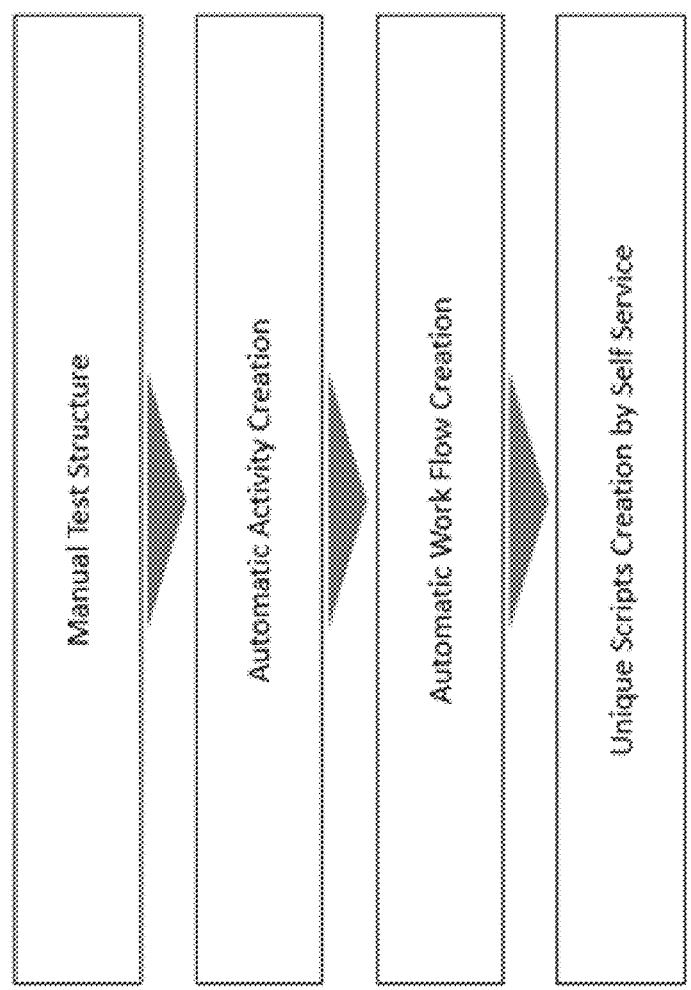
FIG. 2 shows a high level system workflow for automatically converting manual test cases to automated test structures in a software testing project, in accordance with one embodiment.

FIG. 2 shows a high level system workflow 200 for automatically converting manual test cases to automated test structures in a software testing project, in accordance with one embodiment. As an option, the system workflow 200 may be implemented in the context of the details of the previous figure and/or any subsequent figure(s). Of course, however, the system workflow 200 may be implemented in the context of any desired environment. Further, the aforementioned definitions may equally apply to the description below.

As shown, the system uses a manual test structure to create an automatic activity. The system then generates an automatic work flow. Further, the system allows for unique script creation by a user.

Figure 3:
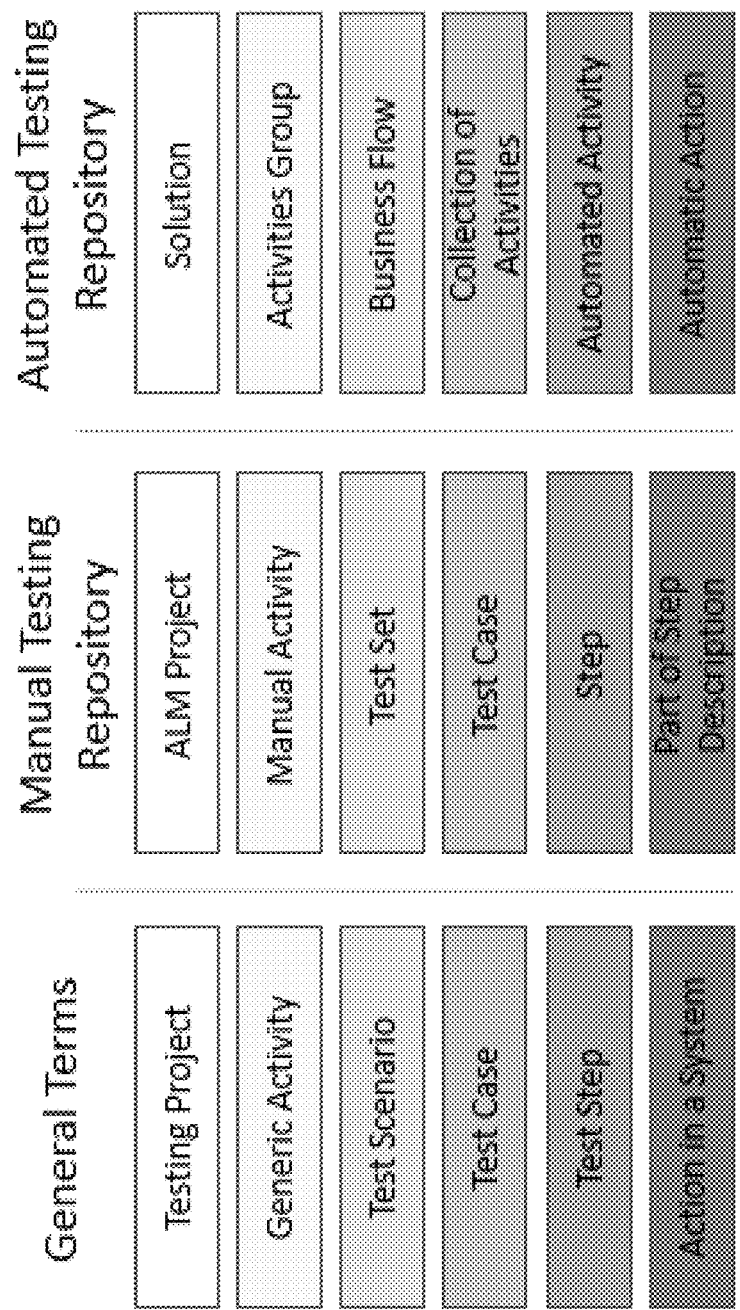
FIG. 3 shows a diagram showing a map of entities and corresponding representations in manual and automatic repositories, in accordance with one embodiment.

FIG. 3 shows a diagram 300 showing a map of entities and corresponding representations in manual and automatic repositories, in accordance with one embodiment. As an option, the diagram 300 may be implemented in the context of the details of the previous figures and/or any subsequent figure(s). Of course, however, the diagram 300 may be implemented in the context of any desired environment. Further, the aforementioned definitions may equally apply to the description below.

In operation, manual test cases may be present in a repository (e.g. a quality center, Jira, Rally, etc.). Within the manual repository, the test cases may be linked to additional testing entities named activities. Each test case in the repository may be linked to one or more activities.

Each activity may contain one or more parameters. Each test case may present a value selected for each parameter defined in the linked activity. The one or more activities linked to the test case contain steps which represent the actions that are expected for a manual tester to perform in order to complete the activity.

Figure 4:
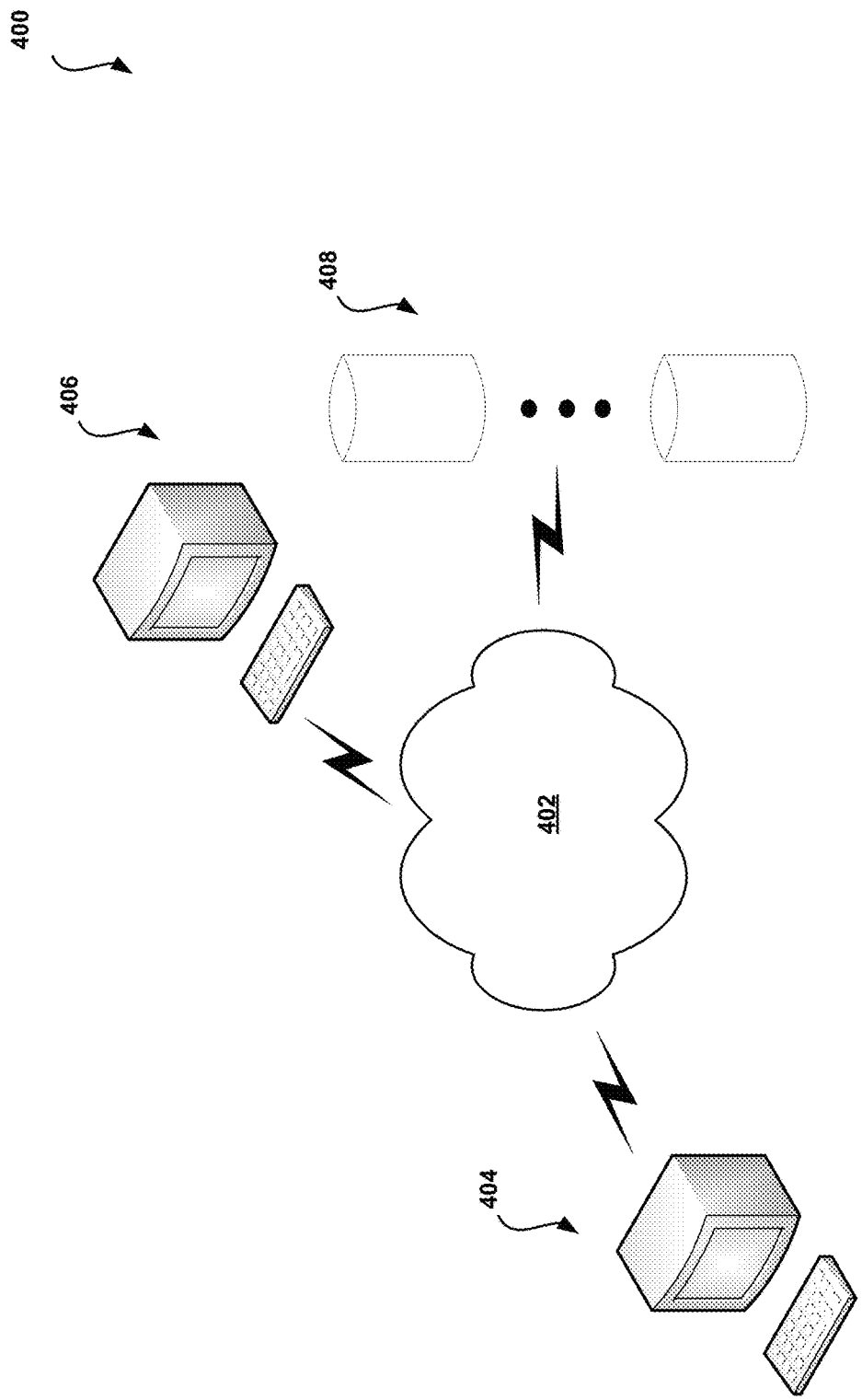
FIG. 4 shows a system for automatically converting manual test cases to automated test structures in a software testing project, in accordance with one embodiment.

FIG. 4 shows a system 400 for automatically converting manual test cases to automated test structures in a software testing project, in accordance with one embodiment. As an option, the system 400 may be implemented in the context of the details of the previous figures and/or any subsequent figure(s). Of course, however, the system 400 may be implemented in the context of any desired environment. Further, the aforementioned definitions may equally apply to the description below.

As shown, the system 400 includes an automation system 404 including an automation platform that is in communication with a system under test 406, either directly, or over one or more networks 402. The automation system 404 is also in communication with one or more test repositories 408 including a manual test cases repository and an automation repository.

In operation, the system 404 implementing the automation platform integrates with the manual test cases repository. The automation system 404 may allow the user to select the scope of test cases that the user would like to translate to automation. The automation system 404 uploads the manual test cases and creates entities in the automation repository for each of them. The automation repository may be structured with entities for each test case in the manual repository, or it may also include entities per lower level steps within the manual activities.

An additional level of automated action may be generated under the entity created from the manual design. At the activity creation stage, a single automated action may be created under each entity, however, a user may add additional actions under it in the case automation description of the activity requires added actions. For example, a manual description of a test may require the user to populate specific information on the screen, such as customer name, etc. To do this, the user may be required to populate multiple fields of different types, as name is not just one field. For automation, each of the fields may be a separate action and therefore multiple automation actions may be required to perform one manual step.

The automation system 404 may utilize the automation platform process for converting manual to automated testing and may also generate the workflow automatically. For this purpose, a higher level entity of activities group may be created to represent the generic manual activity from the activity library.

Once a test case is identified to be linked to a manual activity, the activity group that represents the manual activity may be updated as well as the automated activity. Elements in the automated activity that are common to steps already defined in the activity group may be reused from the activity group and automatically linked. Elements in the automated activity that relate to unique parameter values, which were never used before in the activity group, enrich the activity group. The workflow in the activity group is automatically generated according to the elements impacted by the parameter values.

While each automated activity includes only a single flow of action, each upload of a test case may enrich the activity group with additional sub flows based on the parameter values used in the test case. This allows the activity group to start as a single flow entity and grow into a fully rounded entity, with decision points based on parameter values, according to each automated activity of the same activity group source. This may allow automation testers to reuse the activity group for other created flows, including fully automated tests originated on the automated platform.

This method of conversion may also allow reuse of actual scripts should the same values be used in parameters for part or all of the activity. The common elements that are identified in the activity group as automated may be automatically reused and linked as part of the activity creation process, which enables the user to easily create a map of actions to be executed based on selected values without having to write complex If-Else statements/coding. This also enables a user to have one flow with many activities executed by this dependency map instead of creating a flow per each combination, saving a lot of effort in development and maintenance.

The automation system 404 may support multiple capabilities to allow the user to complete any missing scripts. The activity may be done as part of the design phase or during execution of test cases that are partially automated, to increase their automation rate. Any script added to a test may be automatically added to the activity group it relates to such that any future activity created from the activity group may automatically reuse the published script.

Scripts may be added by self-service non-automation expert testers using recording actions performed on the application's screen. The automation platform may also allow a user to add scripts by selecting predefined functions to perform complex actions for which recording cannot support and which may include conditioned recursive actions, data base searches, random data use, or input rolling from one automated test to the next.

Once the script is created, the user may choose to publish the test, which updates the activity group with the new script. As with the next activity creation, the published script may be automatically reused. Each unique automated script may only be created once.

Thus, in one embodiment, the automation system 404 may implement a method for automatic conversion of manual test cases to automated generic parameterized test activity groups supporting workflow of possible test steps combinations and the automatic generation of the final automated test case linked to the related activity group.

Additionally, in one embodiment, the automation system 404 may implement a method for generating generic parameterized automated test activity groups, reusable for automatic creation of automated and partial automated test cases. In another embodiment, the automation system 404 may implement a method for fully automatic creation of automatic test cases from manual test cases linked to generic test activity groups. In another embodiment, the automation system 404 may implement a method for automated workflow creation within parameterized generic automatic test activity group. In another embodiment, the automation system 404 may implement a method for self service automation creation by non-automation experts through automatic generation of an automated test structure and relation to the relevant parameterized test activity group.

Thus, the automation system 404 supports converting test activities with parameters that change the expected result of the test according to the valid value used. The automation system 404 also supports converting only part of the manual test case in case automatic objects (scripts) cannot be produced for some of the actions in the flow as the tested system has faults blocking from progression.

The automation system 404 allows for keeping the link between complex parameterized activities in manual and automated form. Additionally, the automation system 404 reuses knowledge accumulated during manual tests to generate the automated test and the workflow for the permutation selection based on the valid values of parameters in the flow. The automation system 404 also retains a link to the manual tests such that when additional test design is generated in design tools, the creation of automatic tests will be immediate. The automation system 404 also supports semi-automated tests involving both automated scripts and manual description for the steps which could not or will never be automated.

Further, the automation system 404 has the ability to automatically create the automatic test and retain a link to the generic activity, so even if a different test is created as a manual test, from the same generic activity, the automation can be reused.

Figure 5:
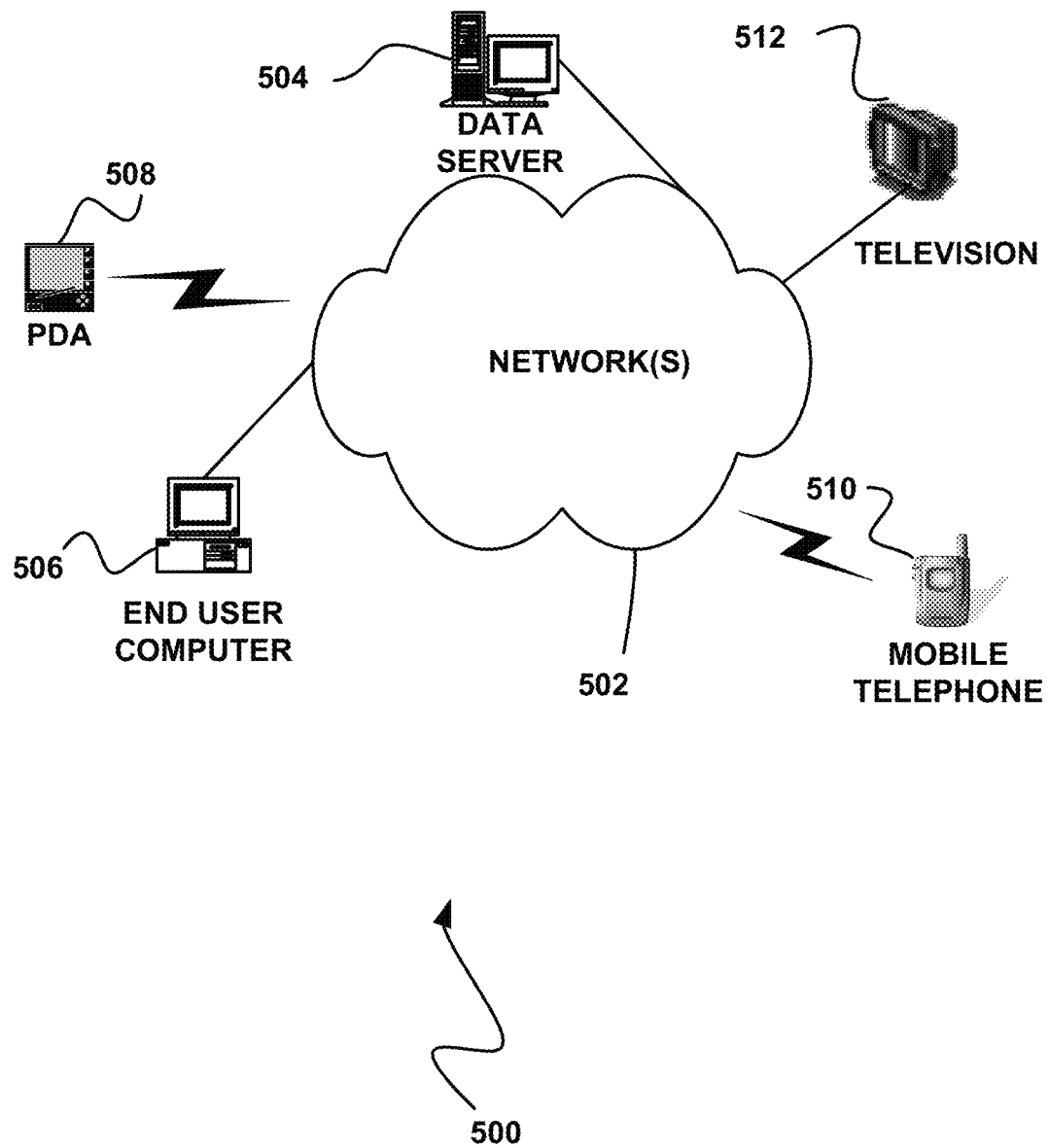
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
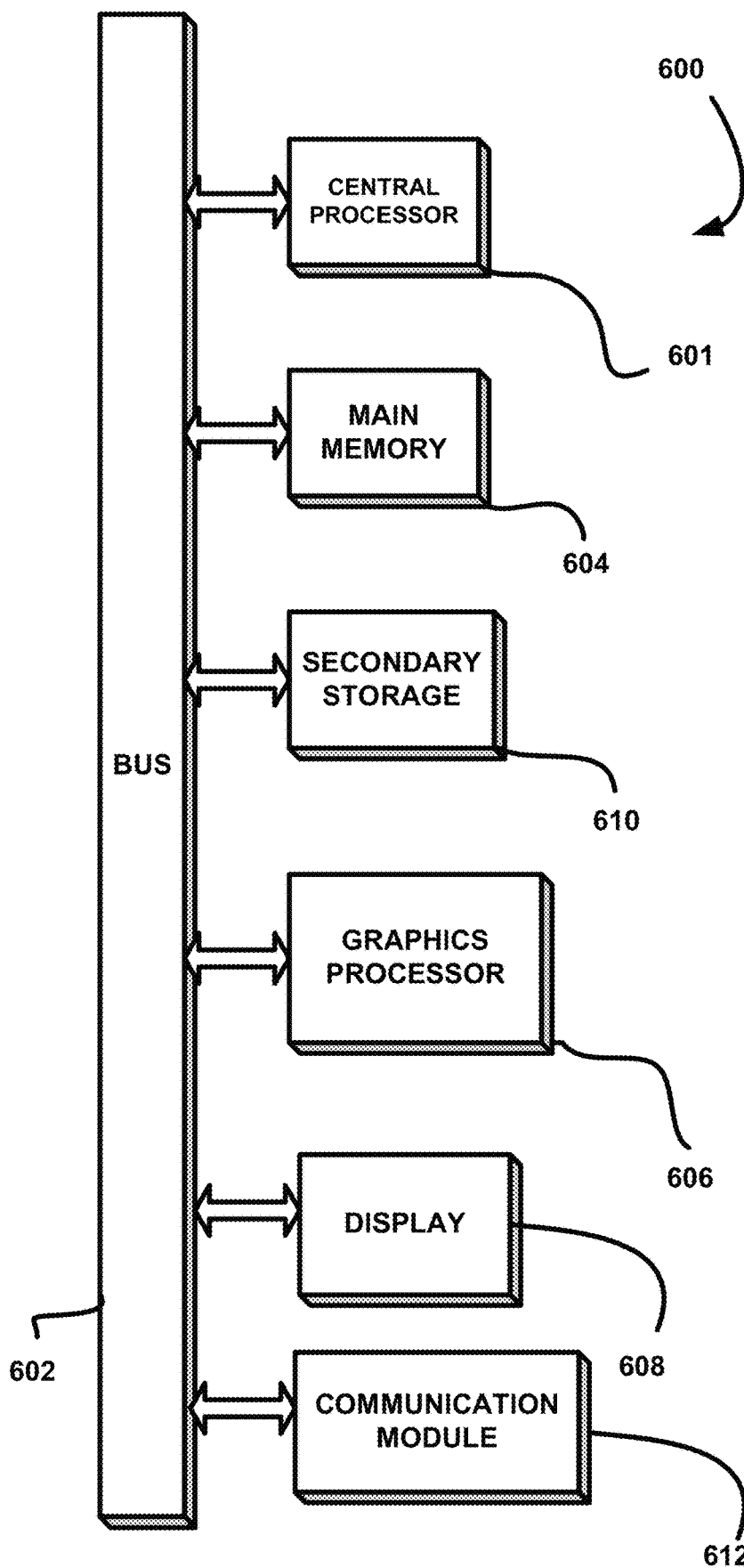
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

storing, in a manual repository, a manual test case linked to one or more activities, each activity of the one or more activities containing steps that represent actions expected for a manual tester to perform in order to complete the activity, wherein each activity of the one or more activities further contains one or more parameters and wherein the manual test case presents a value selected for each of the one or more parameters of each of the one or more activities;

identifying, by an automation system, an activity of the one or more activities;

creating, by the automation system in an automation repository, an automated test case for the activity, the automated test case being a possible flow within the activity as determined by the one or more parameters contained in the activity and the value selected for each of the one or more parameters;

identifying, by the automation system, a generic reusable automated activity group representing the activity of the one or more activities, the generic reusable automated activity group being linked to a plurality of automated test cases for the activity that are each a different possible flow within the activity;

linking, by the automation system, the automated test case to the generic reusable automated activity group, such that the automated test case is added to the plurality of automated test cases linked to the generic reusable automated activity group;

for a particular testing instance associated with the activity:

identifying, by the automation system, a subset of the one or more parameters contained in the activity with which the activity is to be measured and a range of values to be tested for each of the one or more parameters in the subset of the one or more parameters, the subset of the one or more parameters with which the activity is to be measured and the range of values to be tested being selected for the particular testing instance, determining, by the automation system, a subset of automated test cases included in the plurality of automated test cases linked to the generic reusable automated activity group, the subset of automated test cases being determined according to the subset of the one or more parameters contained in the activity to be measured and the range of values for each of the one or more parameters in the subset of the one or more parameters, and automatically generating, by the automation system, a work flow for the reusable generic activity group, the workflow including the subset of automated test cases and being for use in future testing.

2. The method of claim 1, wherein elements in the automated test case for the activity that are common to steps already defined in the reusable generic activity group are reused from the reusable generic activity group and automatically linked.

3. The method of claim 1, wherein the automated test case is linked to the generic reusable automated activity group by adding the automated test case to a database associated with the generic reusable automated activity group.

4. The method of claim 1, wherein the subset of automated test cases each include a unique combination of values selected for the one or more parameters contained in the activity, and wherein the subset of automated test cases are sub-flows of the work flow.

5. The method of claim 1, wherein each automated test case of the plurality of automated test cases is a unique script that is only created once and is reused for different testing instances.

6. A computer program product embodied on a non-transitory computer readable medium, comprising computer code for:

storing, in a manual repository, a manual test case linked to one or more activities, each activity of the one or more activities containing steps that represent actions expected for a manual tester to perform in order to complete the activity, wherein each activity of the one or more activities further contains one or more parameters and wherein the manual test case presents a value selected for each of the one or more parameters of each of the one or more activities;

identifying, by an automation system, an activity of the one or more activities;

creating, by the automation system in an automation repository, an automated test case for the activity, the automated test case being a possible flow within the activity as determined by the one or more parameters contained in the activity and the value selected for each of the one or more parameters;

identifying, by the automation system, a generic reusable automated activity group representing the activity of the one or more activities, the generic reusable automated activity group being linked to a plurality of automated test cases for the activity that are each a different possible flow within the activity;

linking, by the automation system, the automated test case to the generic reusable automated activity group, such that the automated test case is added to the plurality of automated test cases linked to the generic reusable automated activity group;

for a particular testing instance associated with the activity:

identifying, by the automation system, a subset of the one or more parameters contained in the activity with which the activity is to be measured and a range of values to be tested for each of the one or more parameters in the subset of the one or more parameters, the subset of the one or more parameters with which the activity is to be measured and the range of values to be tested being selected for the particular testing instance, determining, by the automation system, a subset of automated test cases included in the plurality of automated test cases linked to the generic reusable automated activity group, the subset of automated test cases being determined according to the subset of the one or more parameters contained in the activity to be measured and the range of values for each of the one or more parameters in the subset of the one or more parameters, and automatically generating, by the automation system, a work flow for the reusable generic activity group, the workflow including the subset of automated test cases and being for use in future testing.

7. An automation system comprising one or more processors operable for:

storing, in a manual repository, a manual test case linked to one or more activities, each activity of the one or more activities containing steps that represent actions expected for a manual tester to perform in order to complete the activity, wherein each activity of the one or more activities further contains one or more parameters and wherein the manual test case presents a value selected for each of the one or more parameters of each of the one or more activities;

identifying, by the automation system, an activity of the one or more activities;

creating, by the automation system in an automation repository, an automated test case for the activity, the automated test case being a possible flow within the activity as determined by the one or more parameters contained in the activity and the value selected for each of the one or more parameters;

identifying, by the automation system, a generic reusable automated activity group representing the activity of the one or more activities, the generic reusable automated activity group being linked to a plurality of automated test cases for the activity that are each a different possible flow within the activity;

linking, by the automation system, the automated test case to the generic reusable automated activity group, such that the automated test case is added to the plurality of automated test cases linked to the generic reusable automated activity group;

for a particular testing instance associated with the activity:

identifying, by the automation system, a subset of the one or more parameters contained in the activity with which the activity is to be measured and a range of values to be tested for each of the one or more parameters in the subset of the one or more parameters, the subset of the one or more parameters with which the activity is to be measured and the range of values to be tested being selected for the particular testing instance, determining, by the automation system, a subset of automated test cases included in the plurality of automated test cases linked to the generic reusable automated activity group, the subset of automated test cases being determined according to the subset of the one or more parameters contained in the activity to be measured and the range of values for each of the one or more parameters in the subset of the one or more parameters, and automatically generating, by the automation system, a work flow for the reusable generic activity group, the workflow including the subset of automated test cases and being for use in future testing.

\* \* \* \* \*